US011467022B2

(12) United States Patent
Chen et al.

(10) Patent No.: US 11,467,022 B2
(45) Date of Patent: *Oct. 11, 2022

(54) ELECTRONIC SCALE AND METHOD FOR CONTROLLING ELECTRONIC SCALE

(71) Applicant: WISTRON CORP., New Taipei (TW)

(72) Inventors: Chih-Kang Chen, New Taipei (TW); Yu Tao Kao, New Taipei (TW); Jiun Lin Wu, New Taipei (TW); Chien Huang, New Taipei (TW)

(73) Assignee: WISTRON CORP., New Taipei (TW)

( * ) Notice: Subject to any disclaimer, the term of this patent is extended or adjusted under 35 U.S.C. 154(b) by 163 days.

This patent is subject to a terminal disclaimer.

(21) Appl. No.: 17/034,047

(22) Filed: Sep. 28, 2020

(65) Prior Publication Data

US 2021/0010852 A1    Jan. 14, 2021

Related U.S. Application Data

(63) Continuation of application No. 16/197,677, filed on Nov. 21, 2018, now Pat. No. 10,928,242.

(30) Foreign Application Priority Data

Aug. 22, 2018    (TW) .................... 107129259

(51) Int. Cl.
  *G01G 23/36*    (2006.01)
  *G01G 17/04*    (2006.01)
(52) U.S. Cl.
  CPC ........... *G01G 17/04* (2013.01); *G01G 23/361* (2013.01)

(58) Field of Classification Search
  CPC .... G01G 17/004; G01G 23/361; G01G 17/04; G01G 19/413
  (Continued)

(56) References Cited

U.S. PATENT DOCUMENTS 4,548,288 A    10/1985    Komoto
7,681,431 B2    3/2010    Roquemore, III et al.
(Continued)

FOREIGN PATENT DOCUMENTS

CN    201199173 Y    2/2009
CN    206974523 U    2/2018
(Continued)

OTHER PUBLICATIONS

CN Office Action dated Dec. 16, 2020 in Chinese application (No. 201811019028.4).
(Continued)

*Primary Examiner* — Jacques M Saint Surin
(74) *Attorney, Agent, or Firm* — McClure, Qualey & Rodack, LLP

(57) ABSTRACT

A method for controlling an electronic scale in disclosed in this disclosure, which is applied to measure and indicate a state of an external force, comprises the following steps. A weight sensor detects the external force, and a controller drives a prompting device to emit a first light with a first optical characteristic when the external force detected by the weight sensor reaches a first weight. The controller drives the prompting device to emit a second light with a second optical characteristic when the prompting device emits the first light for a predetermined period, wherein the prompting device continuously emits the second light until the external force reaches a second weight.

18 Claims, 5 Drawing Sheets

(58) Field of Classification Search
USPC .............................................................. 177/1
See application file for complete search history.

(56) References Cited

U.S. PATENT DOCUMENTS

| | | | |
|---|---|---|---|
| 9,157,787 | B2 | 10/2015 | Sharma |
| 10,852,900 | B2* | 12/2020 | Suh ..................... G07F 17/0064 |
| 10,928,242 | B2* | 2/2021 | Chen ..................... G01G 23/361 |
| 2003/0089531 | A1 | 5/2003 | Montagnino et al. |
| 2005/0209528 | A1 | 9/2005 | Sato et al. |
| 2014/0262553 | A1 | 9/2014 | Pollock et al. |
| 2015/0366258 | A1 | 12/2015 | Tseng |
| 2017/0138782 | A1 | 5/2017 | Beber et al. |
| 2017/0295983 | A1 | 10/2017 | Tseng |
| 2017/0295984 | A1 | 10/2017 | Tseng |

FOREIGN PATENT DOCUMENTS

| | | | |
|---|---|---|---|
| CN | 207095673 | U | 3/2018 |
| CN | 207544804 | U | 6/2018 |
| DE | 202011000198 | U1 | 3/2011 |
| JP | 2005517278 | A | 6/2005 |
| TW | I501741 | B | 10/2015 |
| TW | M526127 | U | 7/2016 |

OTHER PUBLICATIONS

TW Office Action dated Sep. 21, 2020 in Taiwan application (No. 107129259).
TIPO, "Taiwanese Office Action and Search Report for TW Application No. 107129259", Taiwan, dated Aug. 26, 2019.

* cited by examiner

ELECTRONIC SCALE AND METHOD FOR CONTROLLING ELECTRONIC SCALE

CROSS-REFERENCE TO RELATED APPLICATIONS

This non-provisional application claims priority under 35 U.S.C. § 120 on patent application Ser. No. 16/197,677 filed in U.S.A. on Nov. 21, 2018, which claims priority under 35 U.S.C. § 119(a) on Patent Application No(s). 107129259 filed in Taiwan, R.O.C. on Aug. 22, 2018, and the entire contents of which are hereby incorporated by reference.

TECHNICAL FIELD

The disclosure relates to an electronic scale, more particularly to a method for controlling the electronic scale to help a user to learn the preferable way to prepare beverage or drink.

BACKGROUND

Regarding the factors effecting the taste of a cup of coffee, in addition to the coffee beans, the percentage of the coffee to water, the brewing time, as well as the way and the timing to mix coffee powders with the added water, is also important. For the purpose of learning whether the water volume added into the coffee pot and the process are appropriate, there's provided with an electronic scale capable of communicating with the relative mobile application of a user's mobile phone/tablet PC for teaching how to brew the coffee. When using said electronic scale, one should place the coffee pot on the electronic scale firstly, then the electronic scale detects the variance of the weight when the water is continuously added in to the coffee pot, while the electronic scale shows the variance of the weight in the formation of words, figures, diagrams or tables on the mobile application The above information may help the user to learn the preferable way to brew coffee.

However, the user won't be able to know the information from the electronic scale if the mobile application or the mobile phone/tablet PC is not present. Furthermore, when it is needed to brew a plurality of cups of coffee in a short time period, the above said method of display information on mobile application won't help the user to quickly and concurrently brew a plurality of cups of coffee through a standard process.

For the above reasons, there is a need for an electronic scale and the relative control method presently to overcome the above problems.

SUMMARY

An electronic scale and the relative control method is disclosed in this disclosure, which are able to display the figures of the detected weight variance as the particular light color or flashing frequency for indicating the user.

In an embodiment of this disclosure, the method for controlling an electronic scale based on this disclosure, which is applied to measure and indicate an external force, comprises the following steps: A weight sensor detects the external force, and a controller drives a prompting device to emit a first light with a first optical characteristic when the external force detected by the weight sensor reaches a first weight. Additionally, the controller drives the prompting device to emit a second light with a second optical characteristic when the prompting device emits the first light for a predetermined period, wherein the prompting device continuously emits the second light until the external force reaches a second weight.

In another embodiment of this disclosure, the method for controlling the electronic scale based on this disclosure, which is applied to measure and indicate the external force, comprises the following steps: The weight sensor performs a zeroing process, and the controller drives the prompting device to emit the first light when the weight sensor performs the zeroing process. Moreover, the weight sensor detects the external force, and the controller drives the prompting device to emit the second light when the weight sensor detects the external force more than zero and less than the first weight. In addition, the controller drives the prompting device to emit a third light when the external force detected by the weight sensor reaches the first weight. Finally, the controller drives the prompting device to emit a fourth light when the prompting device emits the third light for the predetermined period, wherein the prompting device continuously emits the fourth light until the external force reaches the second weight.

In an embodiment of this disclosure, the electronic scale based on this disclosure comprises the following features: A shell is with a loading surface, and a weighting sensor is disposed in the shell, wherein the weighting sensor generates a weight signal according to the external force detected by the loading surface. Also, the electronic scale comprises a controller disposed in the shell, and the controller electrically connects to the loading surface for receiving the weight signal. Moreover, the electronic scale comprises a prompting device disposed at the shell, and the prompting device electrically connects to the controller. Furthermore, the prompting device comprises at least one light-emitting element disposed on the shell, and the controller drives the at least one light-emitting element of the prompting device to generate the light respectively with different optical characteristics according to a variance of the external force detected by the weight sensor.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

Figure 1:
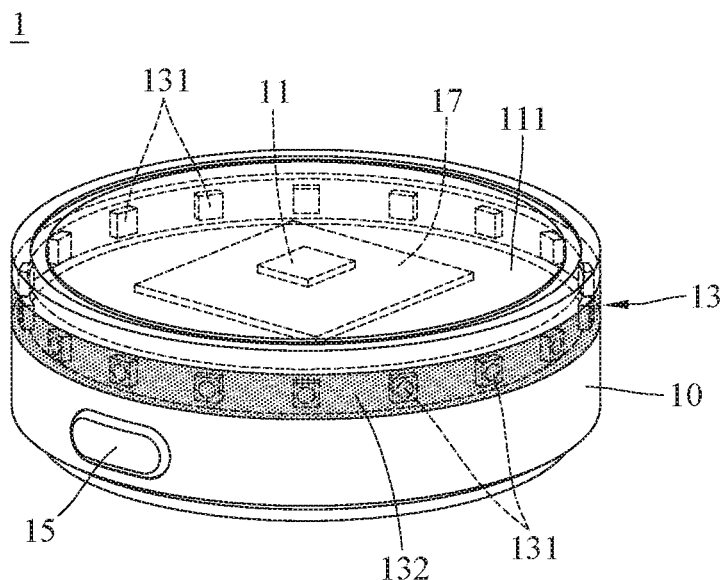
FIG. 1 is the stereogram of the electronic scale in an embodiment based on this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The electronic scale disclosed in the embodiments in this disclosure has no limitation on the kind of the detected objects, and also has no limitation on the brewing procedure for any kind of the drinks. However, the following embodiments are based on the brewing coffee procedure for the specific exemplary illustration, while the detected objects detected by the electronic scale comprises a coffee dripper, filter paper, coffee grounds and a coffee pot.

Figure 2:
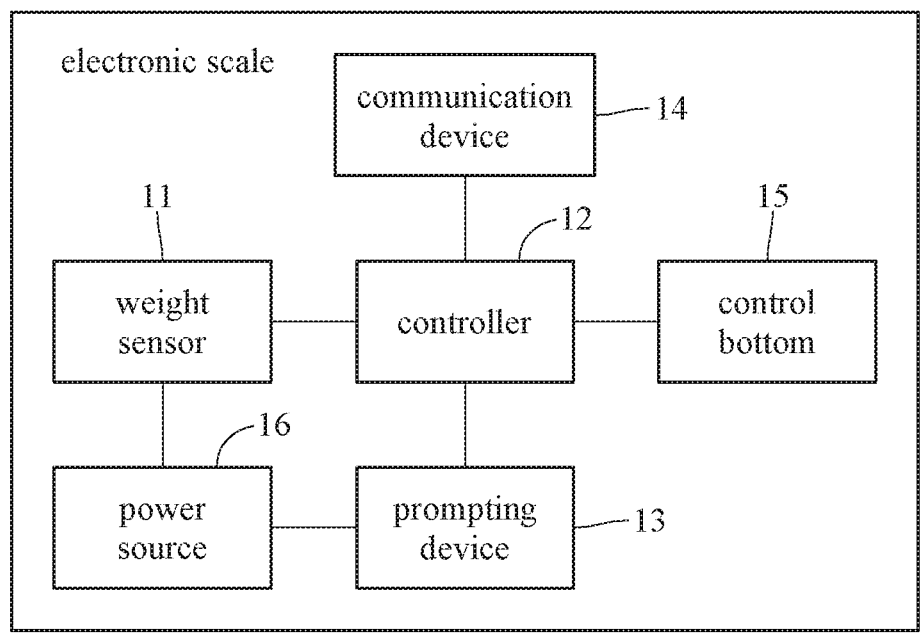
FIG. 2 is the structure diagram of the electronic scale in an embodiment based on this disclosure.
Figure 3:
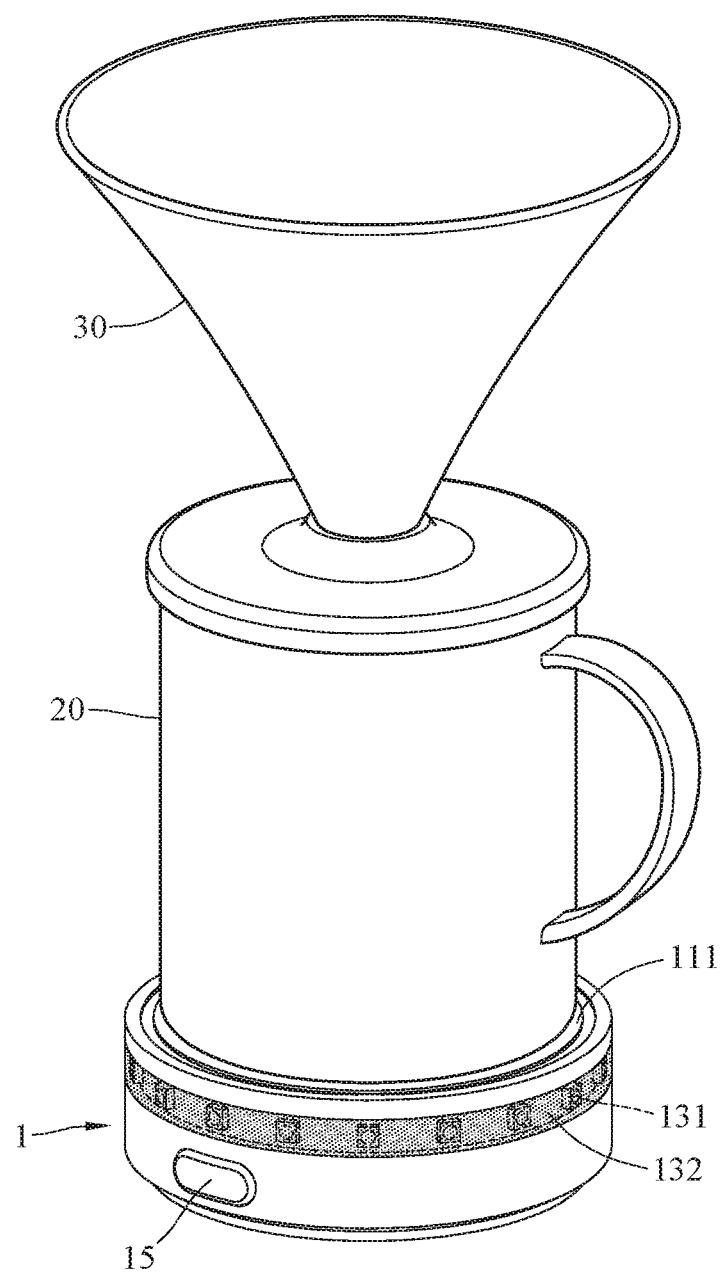
FIG. 3 is the state diagram in use of the electronic scale in an embodiment based on this disclosure.

Please refer to FIG. 1 to FIG. 3. FIG. 1 is the stereogram of the electronic scale in an embodiment based on this disclosure, FIG. 2 is the structure diagram of the electronic scale in an embodiment based on this disclosure, and FIG. 3 is the state diagram in use of the electronic scale in an embodiment based on this disclosure. The electronic scale 1 in this embodiment comprises a shell 10, a weight sensor 11, a controller 12, a prompting device 13, a communication device 14, a control bottom 15 and a power source 16. Additionally, the weight sensor 11, the controller 12, the communication device 14 and the power source 16 may be disposed on a circuit board 17, and each of the above elements electrically connects to each other directly or indirectly. Also, the prompting device 13 and the control bottom 15 may to be disposed on the shell 10 and electrically connect to the circuit board 17.

Specifically, the shell 10 forms a space for receiving the circuit board 17 as well as the above electronic elements, and the prompting device 13 and the control bottom 15 are disposed at or on the shell 10. The shell 10 comprises a loading surface 111, and the loading surface 111 faces to the upside of the electronic scale 1 for loading the detected objects when the electronic scale 1 is in use. As the above descriptions, for the example of brewing coffee, the detected objects include the coffee dripper 30, the filter paper, the coffee grounds and the coffee pot 20.

The weight sensor 11 is under the loading surface 111 in this embodiment, and the weighting sensor 11 generates a weight signal according to the external force (such as the weight of the detected objects) detected by the loading surface 111. The controller 12 electrically connects to the weight sensor 11, and the controller 12 generates a control signal after the weight sensor 11 receives the weight signal. Also, the prompting device 13 electrically connects to the controller 12, and the prompting device 13 generates the related prompting command according to the control signal. Particularly, the prompting device 13 comprises a plurality of light-emitting elements 131, noticed that the prompting device 13 may comprise one light-emitting element 131, alternatively. In addition, the light-emitting elements 131 may be the monochromatic light-emitting diodes (monochromatic LEDs), the multicolor light-emitting diodes (multicolor LEDs) or the optical fibers, and this embodiment is based on the example of multicolor LEDs for illustrating. The prompting device 13 is preferable to be disposed around the loading surface 111 or the periphery of the shell 10, wherein said above light-emitting elements 131 are preferable to be disposed between the intervals along a closed route on the shell 10, and the closed route may be designed as a ring or a polygon. As FIG. 1 shows, said above light-emitting elements 131 are disposed around the surface of the shell 10 in this embodiment. However, as the loading surface 111 is only a part of the top surface of the shell 10, these light-emitting elements 131 is also able to be disposed along the periphery of the top surface of the shell 10, wherein the periphery is parallel or coplanar to the loading surface 111. Furthermore, it may be a light transmitting layer 132 covering the light-emitting element 131 for protecting the light-emitting element 131, and the light from the light-emitting element 131 may be soft through the transmitting layer 132. Said above light-emitting elements 131 are not necessary to be disposed along the said closed route, the light-emitting elements 131 also may be disposed along a line segment (such as a curve) in other embodiment in this disclosure. As the above structures show, the prompting device 13 operates according to the control signal sent from the controller 12 for driving a part of or all of the light-emitting elements 131 to emit the light with specific colors and/or specific flashing frequencies.

The communication device 14 electrically connects to the controller 12, so the controller 12 is able to be communication connection to an external device to the electronic scale 1. For instance, the communication device 14 comprises a Bluetooth modulate. When the user enables the Bluetooth modulate of the mobile communication device for the device to communicate with the communication device 14 by an application program, the electronic scale 1 is able to display the information (such as the variance of the weight detected by the weight sensor 11) in the formation of words, figures, numbers, graphs or tables on the mobile communication device by the application program. Also, the control bottom 15 electrically connects to the controller 12 for turning on or turning off the electronic scale 1 or for setting the weight shown by the electronic scale 1 as zero when the control bottom 15 is actuated (for example, the user presses the control bottom 15). The power source 16 supplies the power to the electronic elements of the electronic scale 1, wherein the electronic elements must operate with the electricity, such as the weight sensor 11, the controller 12, the prompting device 13, the communication device 14. Particularly, the power source 16 may be a battery for supplying DC power, or a DC power receiving port for receiving the external DC power. Also, the power source 16 may be an AC/DC transformer for receiving external AC power.

Figure 4:
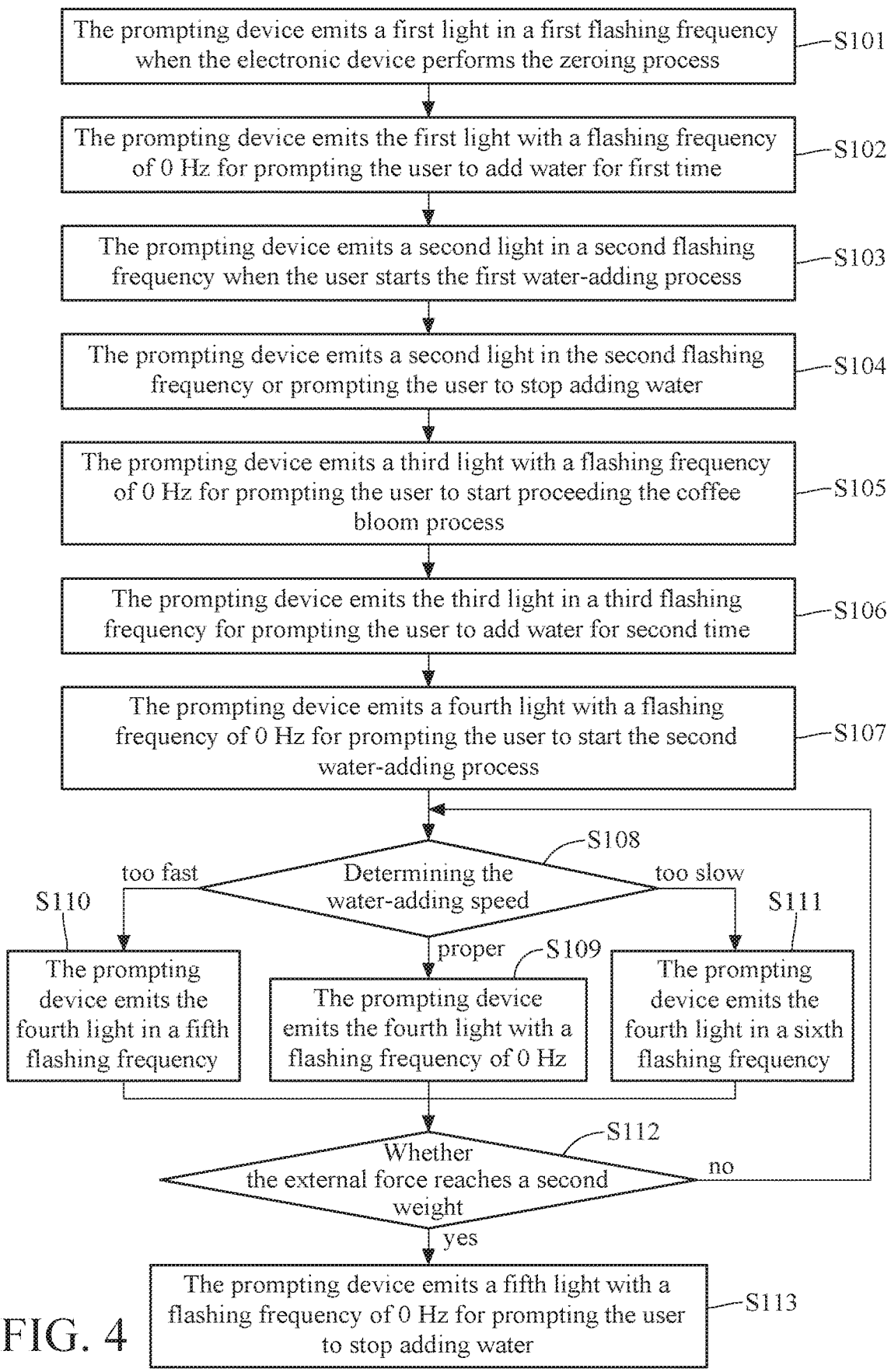
FIG. 4 is the flowchart of the method for controlling the electronic scale in an embodiment based on this disclosure.
Figure 5:
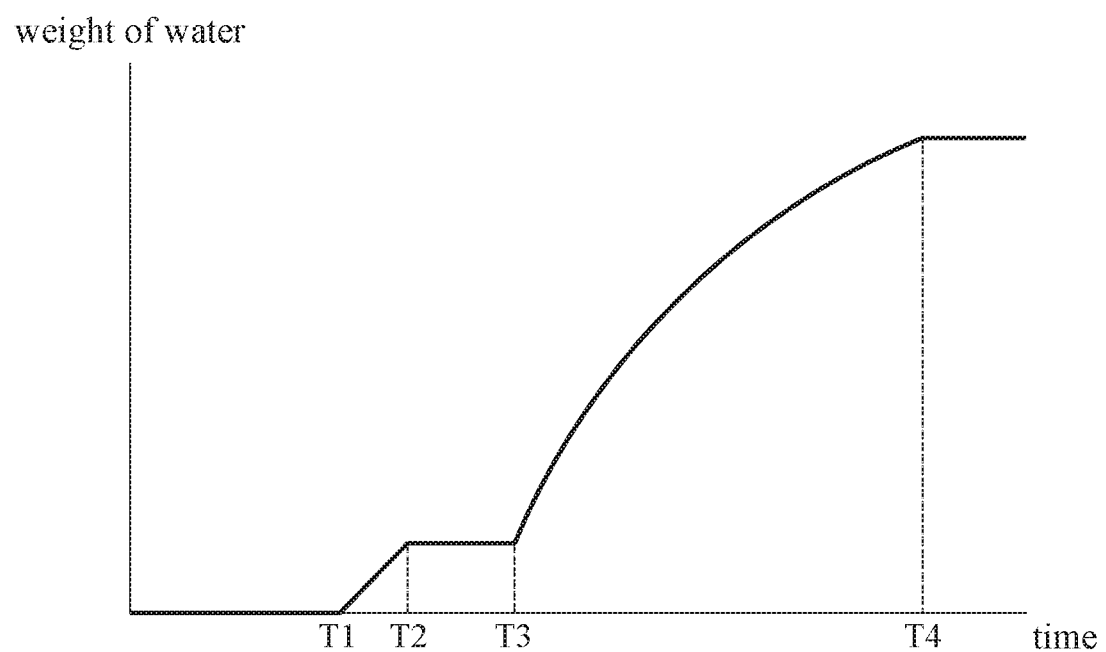
FIG. 5 is the graph related to the time and the weight of the water.

For illustrating the operating process of the electronic scale 1, please refer to FIG. 4 and FIG. 5, wherein FIG. 4 is the flowchart of the method for controlling the electronic scale in an embodiment based on this disclosure, and FIG. 5 is the graph related to the time and the weight of the added water during the process of the method for controlling the electronic scale in this embodiment. For an easy understanding of the operation, the following example is based on the light with different flashing frequencies for prompting. However, any kind of different physical states of the light, such as different brightness levels, may be applied for prompting. This disclosure has no limitation for the prompting form.

As FIG. 4 and FIG. 5 show, for the step S101, the controller 12 drives the prompting device 13 to emit a first light in a first flashing frequency when the electronic scale 1 performs the zeroing process. Specifically, the user is able to press the control bottom 15 for performing the zeroing process after the user puts the detected objects on the loading surface 111 of the electronic scale 1. Hence, the net weight of the detected objects (the weight before adding water) is deducted by the electronic scale 1, and then the electronic scale 1 is able to merely display the weight of the water added in the coffee pot 20 by the user. Moreover, the following description defines the weight of the water added into the coffee pot 20 as the external force detected by the weight sensor 11. Because the first light flashes in the above first flashing frequency, the electronic scale 1 is able to obviously prompt the user that the electronic scale 1 is currently in the zeroing process. Additionally, the first light is white light in this embodiment.

For the step S102, as the zeroing process is finished, the controller 12 drives the prompting device 13 to emit the first light with a flashing frequency of 0 Hz (namely, continuously emitting the first light) for prompting the user to add water.

For the step S103, the user adds the water continuously for the first water-adding process (as the time period between T1 to T2 shown in FIG. 5), and the controller 12 drives the prompting device 13 to emit a second light with the flashing frequency of 0 Hz when the external force detected by the weight sensor 11 is more than zero and less than a first weight W1. In this embodiment, the second light is blue, and the above first water-adding process is for the purpose of making the coffee grounds be wet.

For the step S104, the controller 12 drives the prompting device 13 to emit a second light with a second flashing frequency when the external force detected by the weight sensor 11 almost reaches the first weight W1 (for example, the weight of the water is less than the first weight W1 for 5 grams, or the weight of the water reaches 95% of the first weight W1, but this disclosure is not thus limited). This step prompts the user to stop the first water-adding process. Moreover, the second flashing frequency may equal to the first flashing frequency or be more than or less than the first flashing frequency.

For the step S105, the controller 12 drives the prompting device 13 to emit a third light with a flashing frequency of 0 Hz when the external force detected by the weight sensor 11 reaches a first weight W1. Furthermore, the third light is red light in this embodiment, wherein the third light is applied to prompt the user to stop adding water in order to start proceeding the coffee bloom process (shown as time T2 to time T3 in FIG. 5).

For the step S106, when the prompting device 13 emits the third light almost for a bloom period (such as starting at time T2 and passing by a time period less than the total time period (T3–T2) for one second only or starting at time T2 and passing by 95% of the period (T3–T2), wherein the above conditions are the examples for description, and this disclosure is not thus limited by any other conditions), the controller 12 drives the prompting device 13 to emit the third light at the third flashing frequency for prompting the user that the bloom period will be finished soon. In this embodiment, the length of the bloom period is shown as the time period (T3–T2) in FIG. 5. Furthermore, the third flashing frequency may equal to the first frequency flashing frequency. However, the third flashing frequency may be more than or be less than the first frequency flashing frequency.

For the step S107, when the prompting device 13 emits the third light almost for the bloom period, the controller 12 drives the prompting device 13 to emit the fourth light with a flashing frequency of 0 Hz for prompting the user to start to add water again. In addition, the fourth light is blue in this embodiment.

For the step S108, when the user performs the second water-adding process (shown as the period "time T3 to time T4" in FIG. 5) and adds the water continuously, one of the following steps S109-S111 are performed. Specifically, if the changing rate of the external force detected by the weight sensor 11 is in a weight changing rate range, that is, the user adds water at a proper speed, the process performs the step S109. If the changing rate of the external force detected by the weight sensor 11 is higher than the weight changing rate range, it means that the user adds water too fast and the process performs the step S110. Alternatively, if the changing rate of the external force detected by the weight sensor 11 is lower than the weight changing rate range, it means that the user adds water too slow and the process performs the step S111. In an embodiment, the weight changing rate range includes a upper limit of the weight changing rate and a lower limit of the weight changing rate. For example, the weight changing rate range may be 5 g/sec to 8 g/sec, if the changing rate of the external force equals to 5 g/sec or 8 g/sec, both of the two above conditions are in the weight changing rate range. Otherwise, if the changing rate of the external force is smaller than 5 g/sec, said changing rate is lower than the weight changing rate range; also, if the changing rate of the external force is larger than 8 g/sec, said changing rate is higher than the weight changing rate range. In another embodiment, the weight changing rate range doesn't include the upper limit of the weight changing rate and the lower limit of the weight changing rate. In other words, if the changing rate of the external force equals to 5 g/sec, said changing rate is lower than the weight changing rate range, and the changing rate of the external force is higher than the weight changing rate range if the changing rate of the external force equals to 8 g/sec.

For the step S109, the controller 12 drives the prompting device 13 to emit the fourth light with a flashing frequency of 0 Hz for prompting the user to keep the current speed of adding water. For the step S110, the controller 12 drives the prompting device 13 to emit the fourth light at a fifth flashing frequency for prompting the user to add water slower than the current speed. For the step S111, the controller 12 drives the prompting device 13 to emit the fourth light at a sixth flashing frequency for prompting the user to add water faster than the current speed. The sixth flashing frequency is smaller than the fifth flashing frequency in this embodiment, but the sixth flashing frequency may be larger than the fifth flashing frequency in other embodiment. The process is preferable to perform the following step S112 after said step S108, S110 or S111 is performed for a preset period (such as 1 second) and reflects whether the speed of adding water is in a proper range. As a result, the user is able to precisely control the process of adding water.

After the prompting device 13 prompts the information about the water-adding speed to the user through the above step S109, S110 or S111), the process performs the step S112: the controller 12 determines whether the external force detected by the weight sensor 11 reaches a second weight W2 according to the weight signal sent from the weight sensor 11. If said external force detected by the weight sensor 11 does not reach the second weight W2, the process performs the above step S108 for determining the relation between the changing rate of the external force and the weight changing rate range again. Alternatively, if said external force detected by the weight sensor 11 reaches the second weight W2, the process performs the following step S113.

For the step S113, the controller 12 drives the prompting device 13 to emit the fifth light with a flashing frequency of 0 Hz for prompting the user to stop adding water immediately since the coffee brewing procedure is finished. In addition, the fifth light is white in this embodiment.

In another embodiment based on this disclosure, the step S104 and the step S106 of the proposed method for controlling the electronic scale may be skipped. In other words, when the detected external force almost reaches the first weight W1 and the brewing procedure almost reaches the bloom period, the prompting device 13 does not prompt the user by the second light at the second flashing frequency and the third light at the third flashing frequency. The method for controlling the electronic scale in yet another embodiment based on this disclosure, the first light, the second light, the third light, the fourth light and the fifth light may be in the same color with different brightness levels. For instance, the first light, the second light, the third light, the fourth light and the fifth light are green lights with brightness levels from bright to dark, or blue lights with brightness levels from bright to dark. Alternatively, another embodiment of the method for controlling the electronic scale different from the above two embodiments, the first light, the second light, the third light, the fourth light and the fifth light may be in different colors. For instance, the first light, the second light, the third light, the fourth light and the fifth light are in the white, the red, the blue, the green and the purple. In short, the group of the first light, the second light, the third light, the fourth light and the fifth light comprises at least one different optical characteristic. Particularly, any two lights sequentially shown next to each other comprise at least one difference in optical characteristic. Hence, by the different optical characteristics, the user is able to visually distinct that the brewing procedure is changing.

Figure 8:
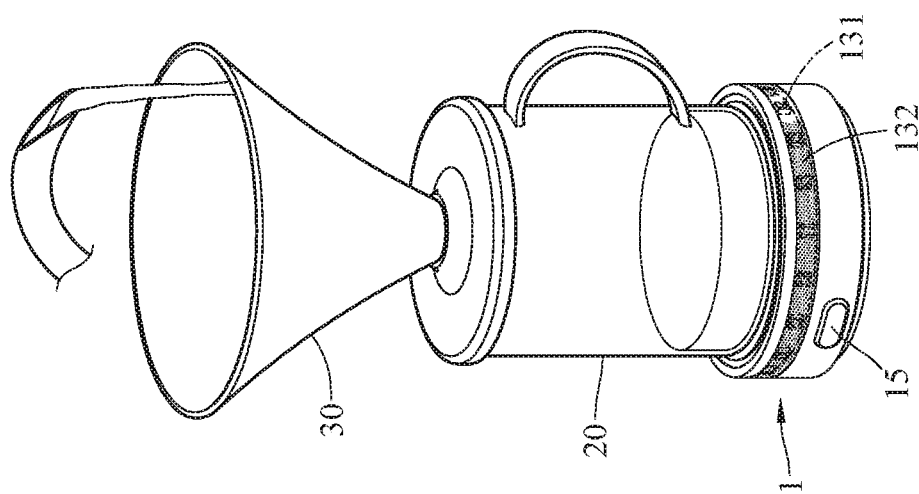
FIG. 6 to FIG. 8 are the schematic diagram of the prompting device for prompting the user in another embodiment based on this disclosure.
Figure 7:
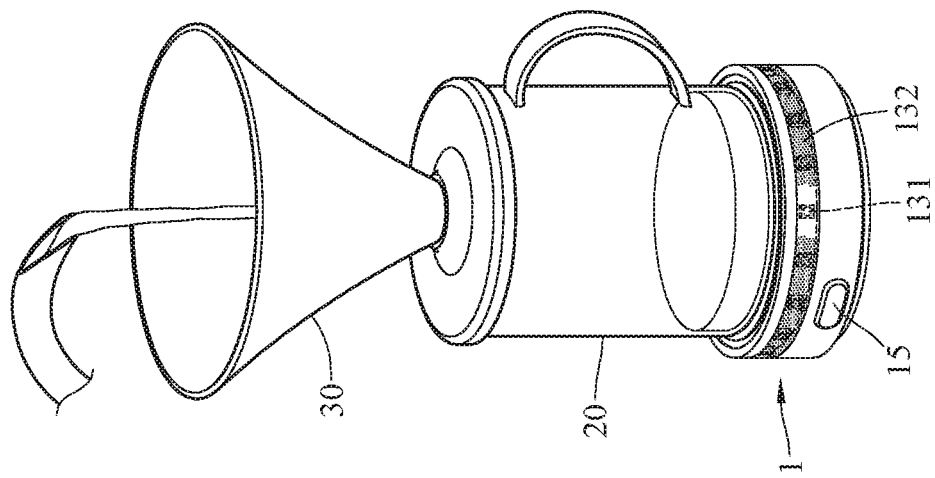
Figure 6:
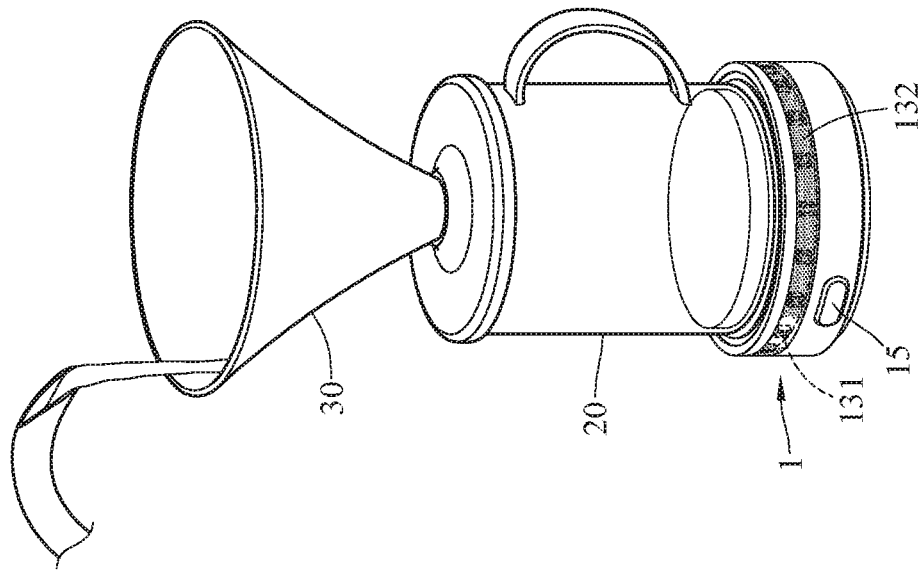

Please refer to FIG. 6 to FIG. 8. FIG. 6 to FIG. 8 are the schematic diagrams of the prompting device of the electronic scale for prompting the user in another embodiment based on this disclosure. As performing the first water-adding process or the second water-adding process in the brewing procedure, the user holds the kettle for adding water around the interior face of the coffee dripper 30. Usually, the moving speed of the kettle around the coffee dripper 30 affects the quality of the coffee. Thus, in this embodiment, the controller 12 drives the light-emitting elements 131 of the prompting device 13 to emit the light sequentially with a switching frequency, while the prompting device 13 prompts the user to move the kettle for adding water at a proper position related to the lightened one(s) of the light-emitting elements 131. For example, in the step S103, it may enable only one or few of said light-emitting elements 131 to emit the second light. Hence, the user is able to observe that whether the dropped point of the adding water is close to the one(s) of the light-emitting elements 131, which emits the second light. For the same reason, for the step S109 to the step S111, it may enable only one or few of said light-emitting elements 131 to emit the fourth light. Thus, the user is able to observe that whether the dropped point of the adding water is close to the light-emitting elements 131 which emits the fourth light. However, the prompting method may also work in a reverse way. For example, it may enable most of the light-emitting elements 131, and the user is prompted by one or few of the unlit light-emitting elements 131, which are disabled and indicate the proper position.

Through the electronic scale and the control method thereof disclosed in this disclosure, according to the default setting or the user setting, the controller sends the control signal so as to drive a part of or all of the light-emitting elements to emit the light with the specific color or the specific flashing frequency. Hence, without the application program or the mobile phone for displaying the information, the electronic scale is still able to prompt the user to finish the coffee brewing procedure properly. Furthermore, when the light-emitting elements 131 disposed along the above route on the prompting device 13 are lightened in order, this process further helps the user to control the moving path of the dropped position of the adding water. As a result, the quality of the brewed coffee is improved by this method.

The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A method for controlling an electronic scale to measure and indicate an external force, the method comprising:
   detecting the external force increased by a weight sensor;
   driving a prompting device to emit a first color light with a first flashing frequency by a controller when a changing rate of the external force detected by the weight sensor is in a weight changing rate range;
   driving the prompting device to emit the first color light with a second flashing frequency by the controller when the changing rate of the external force detected by the weight sensor is higher than the weight changing rate range; and
   driving the prompting device to emit the first color light with a third flashing frequency by the controller when the changing rate of the external force detected by the weight sensor is lower than the weight changing rate range,
   wherein the first, second, and third flashing frequencies are different flashing frequencies.

2. The method for controlling an electronic scale according to claim 1, wherein the second flashing frequency is less than the third flashing frequency.

3. The method for controlling an electronic scale according to claim 1, wherein the prompting device comprises a plurality of light-emitting elements arranged in a route, and wherein the flashing frequency is to drive a part or all of the light-emitting elements to sequentially emit the first color light with a switching frequency.

4. The method for controlling an electronic scale according to claim 1, wherein the method further comprises:
   determining whether the external force detected by the weight sensor reaches a first weight;
   in response to determination that the external force detected by the weight sensor reaches the first weight, driving the prompting device to emit a second color light by the controller; and
   when the prompting device emitting the second color light for a predetermined period, driving the prompting device to emit the first color light by the controller.

5. The method for controlling an electronic scale according to claim 4, wherein the method further comprises:
   driving the prompting device emitting a third color light when the external force detected by the weight sensor is more than zero and less than the first weight.

6. The method for controlling an electronic scale according to claim 5, wherein the method further comprises:
   before driving the prompting device emitting a third color light when the external force detected by the weight sensor is more than zero and less than the first weight, performing a zeroing process for the weight sensor; and
   driving the prompting device emitting a fourth color light by the controller when the weight sensor performs the zeroing process.

7. The method for controlling an electronic scale according to claim 1, wherein the method further comprises:
   driving the prompting device to emit the first color light until the external force detected reaches a second weight.

8. The method for controlling an electronic scale according to claim 6, wherein a color of any two of the fourth color light, the third color light, the second color light and the first color light sequentially shown next to each other are in different colors.

9. The method for controlling an electronic scale according to claim 6, wherein a color of any two of the fourth color light, the third color light, the second color light and the first color light sequentially shown next to each other are in different brightness levels of the color.

10. An electronic scale, comprising:
a shell with a loading surface;
a weighting sensor disposed in the shell, wherein the weighting sensor generates a weight signal according to an external force applied on the loading surface;
a controller disposed in the shell and electrically connecting to the weighting sensor for receiving the weight signal; and
a prompting device electrically connecting to the controller,
wherein the controller determines a changing rate of the external force increased detected by the weight sensor relative to a weight changing rate range to drive the prompting device to emit a first color light with different corresponding flashing frequency.

11. The electronic scale according to claim 10, wherein the prompting device comprises a plurality of light-emitting elements arranged in a route, and the controller drives a part or all of the light-emitting elements to sequentially emit the first color light with a switching frequency.

12. The electronic scale according to claim 10, wherein the controller executes a method comprising:
detecting the external force increased by the weight sensor;
driving the prompting device to emit the first color light with a first flashing frequency when the changing rate of the external force detected by the weight sensor is in the weight changing rate range;
driving the prompting device to emit the first color light with a second flashing frequency when a changing rate of the external force detected by the weight sensor is higher than the weight changing rate range; and
driving the prompting device to emit the first color light with a third flashing frequency when the changing rate of the external force detected by the weight sensor is lower than the weight changing rate range.

13. The electronic scale according to claim 10, wherein the controller executes the method further comprises:
determining whether the external force detected by the weight sensor reaches a first weight;
in response to determination that the external force detected by the weight sensor reaches the first weight, driving the prompting device to emit a second color light; and
when the prompting device emitting the second color light for a predetermined period, driving the prompting device to emit the first color light.

14. The electronic scale according to claim 13, wherein the controller executes the method further comprises:
driving the prompting device emitting a third color light when the external force detected by the weight sensor is more than zero and less than the first weight.

15. The electronic scale according to claim 14, wherein the controller executes the method further comprises:
before driving the prompting device emitting a third color light when the external force detected by the weight sensor is more than zero and less than the first weight, performing a zeroing process for the weight sensor; and
driving the prompting device emitting a fourth color light when the weight sensor performs the zeroing process.

16. The electronic scale according to claim 10, wherein the controller drives the prompting device to emit the first color light until the external force detected reaches a second weight.

17. The electronic scale according to claim 15, wherein a color of any two of the fourth color light, the third color light, the second color light and the first color light sequentially shown next to each other are in different colors.

18. The electronic scale according to claim 15, wherein a color of any two of the fourth color light, the third color light, the second color light and the first color light sequentially shown next to each other are in different brightness levels of the color.

* * * * *